Aug. 13, 1940.  R. R. R. SARAZIN  2,211,076
MEANS FOR IMPARTING IMPULSES TO A SYSTEM
Filed Dec. 5, 1938
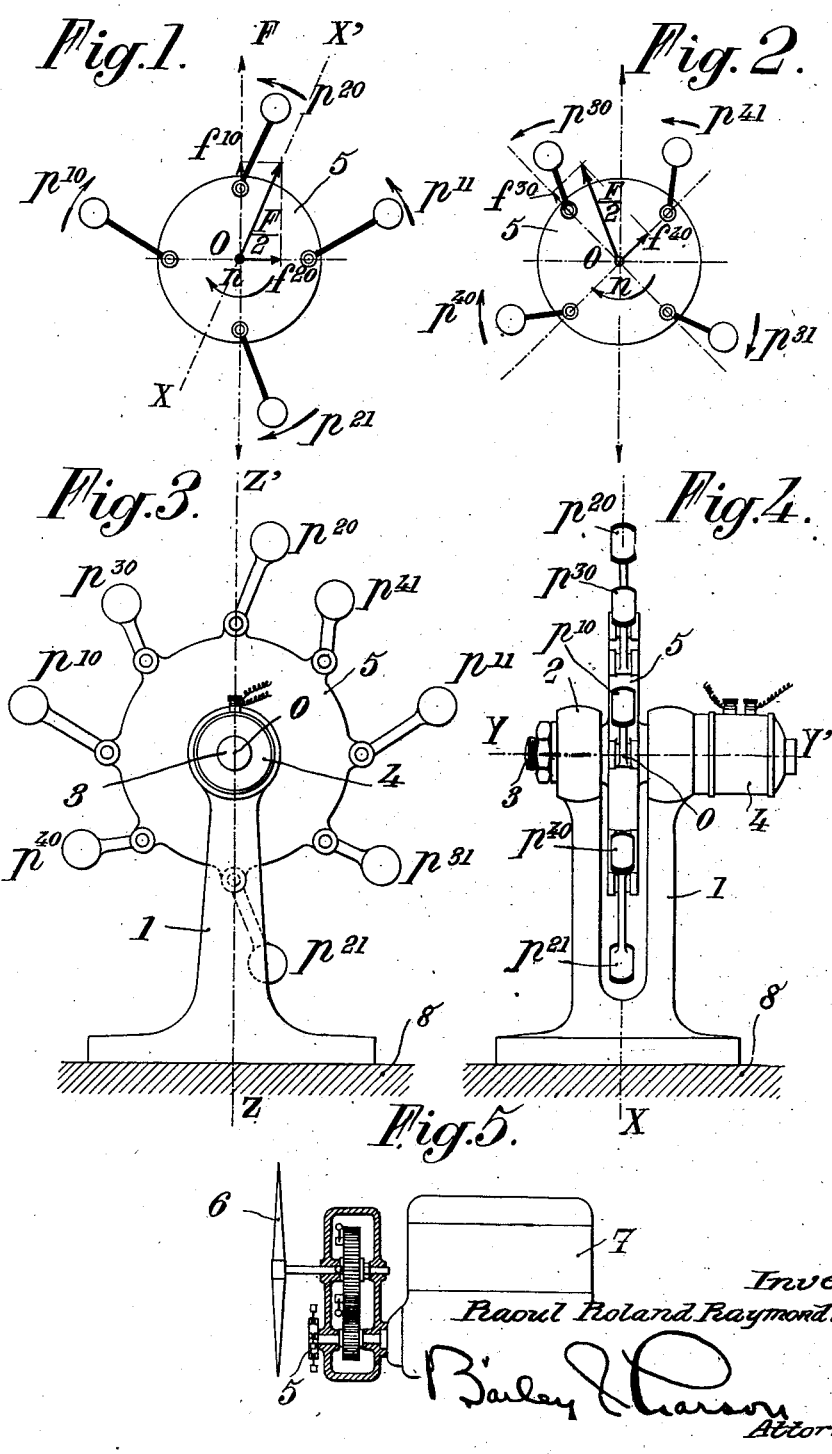
Inventor:
Raoul Roland Raymond Sarazin Patented Aug. 13, 1940

2,211,076

UNITED STATES PATENT OFFICE 2,211,076

MEANS FOR IMPARTING IMPULSES TO A SYSTEM

Raoul Roland Raymond Sarazin, Saint-Prix, France

Application December 5, 1938, Serial No. 244,093
In Luxemburg August 2, 1938

9 Claims. (Cl. 74—574)

The present invention relates to means for imparting impulses to a system, and it is more especially although not exclusively concerned, among means of this kind, with those for eliminating, at least partly, through suitable impulses, the vibrations of a piece or a system.

The chief object of the present invention is to provide a device of the type above mentioned which is better adapted to meet the requirements of practice than devices used for the same purpose up to the present time.

There are devices constituted by an element rotating with respect to a fixed frame, at a given speed of $n$ revolutions per unit of time, and by a pendular system eccentrically pivoted to said rotating element, these devices being such that, when said pendular system oscillates at its natural frequency of about a mean radial position, it produces, on the rotating element:

a. either only a pulsatory force of a frequency equal to $nf$ rotating at speed $n$; or b. both a force of this kind and a mere pulsatory torque coaxial with the rotating element and of a frequency equal to $nf$.

According as the case may be, the pendular system is caused to oscillate in one of the following manners:

Either under the very effect of a perturbing vibration to which the action of the pendular system is to oppose itself;

Or through the effect of means which control and maintain the oscillation at a frequency $nf$.

The essential feature of the present invention consists in grouping into a single system a plurality of such means including pendular systems of the same natural frequency and out of phase with respect to one another, these systems being distributed in such a manner that, when they oscillate, the resultant of their action upon the rotating element that carries them is a force, radial with respect to the axis of said element, turning, about said axis, at a speed different from that corresponding to $n$.

Other features of the present invention will result from the following detailed description of some specific embodiments thereof.

Preferred embodiments of the present invention will be hereinafter described, with reference to the accompanying drawing, given merely by way of example, and in which:

Fig. 1 is an explanatory diagram which will be referred to in the description of the principle of the invention;

Fig. 2 is another explanatory diagrammatical view of the same kind;

Fig. 3 is an elevational view of a device made according to the invention, for the absorption of vibrations;

Fig. 4 is side elevational view corresponding to Fig. 3;

Fig. 5 is a diagrammatical view illustrating the application of the invention to the balancing of an airplane propeller.

In the following description, it will be supposed that a perturbing force of constant value, acting upon a given body in a direction XOX', turning at a rate N about an axis YOY', is to be balanced by a compensating force, also rotating about said axis YOY' perpendicular to XOX', said compensating force being, at any time, substantially equal and opposed to said perturbing force.

I secure to the above mentioned body a frame in which are mounted bearings 2 having their axes parallel to said axis YOY', or even preferably coinciding with said axis.

I mount, in said bearings, a shaft 3 adapted to be driven, for instance by means of an electric motor 4, at the rate of $n$ revolutions per second.

This shaft 3 carries a disc 5 or the like.

Eccentrically pivoted to this disc, about axes parallel to axis YOY', there are at least three pendular elements regularly distributed about the axis of shaft 3, these pendulums having all the same characteristics and in particular the same natural frequency $nf$ equal to $n-N$.

With such an arrangement, under the effect of the rotating perturbing force, said pendulums are automatically set into oscillation with the desired difference of phase for producing a reaction substantially equal and always opposed to the perturbing force that is to say turning at a rate corresponding to N.

This phenomenon is, so to speak, analogous to the creation of "rotary fields" in alternating electric machines having at least three phases. In this case, also, I may use any number of pendulums provided that said number is at least 3.

By way of example, I will describe a device including four pendulums distributed in two groups of two pendulums each, arranged at 90° to one another (Fig. 1), this device being intended to oppose vibrations produced by a rotary force of constant value $$\frac{F}{2}$$

turning at a rate $N_1$ about axis YOY'.

Disc 5 having been provided and mounted as above explained, the following elements are pivotally mounted thereon:

a. At two points diametrically opposed to each other, preferably at the periphery, two pendulums $p^{10}$, $p^{11}$, having both the same characteristics and capable of oscillating with a natural frequency $nf^1$ when the disc rotates at speed $n$;

b. At two other points, also diametrically opposed to each other, along a line at right angles to the diameter corresponding to the two first mentioned pendulums, two other pendulums $p^{20}$, $p^{21}$, identical with the two first mentioned pendulums.

With such an arrangement, under the effect of the rotating force, when disc 5 turns at speed $n$, these pendulums start oscillating in the manner which will now be explained.

The perturbing rotary force which is to be compensated corresponds to the combination of a group of two pulsatory forces $f^{10}$, $f^{20}$, of a maximum amplitude $$\frac{F}{2}$$

respectively directed along two vectors making an angle of 90° with each other, these vectors being caused to rotate together with disc 5 and both having a frequency $nf^1$.

With such an arrangement, it will be readily understood that pendulums $p^{10}$ and $p^{11}$, driven at frequency $n$ and the natural frequency of which is $nf^1$, can produce, when respectively set into oscillation under the effect of one of the pulsatory components of the perturbing rotary force, to wit component $f^{10}$, a compensating pulsatory force which, at any time, is substantially equal and directly opposed to said component. In a similar manner, pendulums $p^{20}$ and $p^{21}$, the natural frequency of which is also $nf^1$, act in the same manner with respect to the second component $f^{20}$ (Fig. 1).

Of course, the values of $n$ and $f^1$ depend upon the absolute speed of revolution $N^1$.

For instance, if it is desired to compensate for a perturbing rotary force acting upon a body along a line turning at the rate of 2 revolutions per second, since $N^1$ is equal to $n(1-f^1)$, it is possible, for instance, to choose a value of $n$, so that the value of $f^1$ results therefrom.

For instance, taking $n$ equal to 100 revolutions per second, I find that $nf^1$ must be equal to 98 per second, so that the characteristics of the pendulums can easily be calculated.

Experience has taught that, when the various elements of the system which has just been described are suitably determined, the respective pendulums start oscillating each in the correct manner and the desired reaction is created under the very effect of the perturbing vibration.

In any event, the possibility of giving a speed of revolution $n$ as high as necessary to the apparatus makes it possible with a simple and light apparatus, to produce considerable rotary forces.

By way of example, I will indicate the application of the invention to the compensation of a defect in the balancing of an airplane propeller 6 driven by an engine 7 through a speed reducing gear which causes the propeller to turn at the rate of $N^1$ revolutions when the driving shaft turns at the rate of $n$ revolutions (Fig. 5).

If the propeller is unbalanced, which is always more or less the case in actual practice, the frame of the engine undergoes the action of a perturbing force of constant value turning at speed $N^1$.

It is sufficient to secure on the shaft of the engine (which turns at speed $n$) a device, analogous to that above described, constituted by pendulums of a natural frequency equal to $nf=N^1+n$, for producing a force constantly equal and opposed to that created by the unbalancing of the propeller.

In a similar manner, a pendular device fitted on the propeller carrying shaft would make it possible to compensate for a rotary force resulting from the operation of the engine, for instance a force of the order 1 with respect to the driving shaft such as that created, in radial engines, by the system of connecting rods.

The pendular devices above mentioned may advantageously be carried by the pinions of the speed reducing gear.

Another application of the invention is the reduction of pulsatory forces, either rotary or not.

It is known that a pulsatory force of maximum value equal to F and of a frequency A, turning with an angular velocity B about an axis YOY' can be decomposed into two constant forces of a value equal to $$\frac{F}{2}$$

turning respectively at speeds $N^1$ and $N^2$, all these values being given by the following formulas:

$$A=\frac{N^1-N^2}{2} \text{ and } B=\frac{N^1+N^2}{2}$$

Therefore, it will be sufficient, in order to oppose such a pulsatory force, to use two devices, such as those which have been above described, capable of producing forces of a value equal to $$\frac{F}{2}$$

turning respectively at speeds $N^1$ and $N^2$.

Therefore, with a device such as that above described with reference to Fig. 1, I combine a second device of the same kind including two groups of pendulums $p^{30}$, $p^{31}$ and $p^{40}$, $p^{41}$, pivoted as shown by Fig. 2 on plate 5 and having a frequency $nf^2=N^2+n$, these groups respectively compensating the components $f^{30}$, $f^{40}$, of a force $$\frac{F}{2}$$

turning at speed $N^2$.

Such an arrangement, shown by Figs. 3 and 4, is adapted to work so that the pendulums, when they are started into movement with suitable dephasing, exert actions the resultant of which is a pulsatory force which is always substantially equal and opposed to the force to be compensated.

For instance, when it is desired to compensate a perturbing force of a frequency A equal to 2 per second acting upon a body 8 (Figs. 3 and 4) in a direction ZOZ' which is fixed in space, so that B is equal to zero, it is possible, for instance to take $n$ equal to 100, $nf^1$ to 98 and $nf^2$ to 102.

It will be readily understood that such an apparatus can be utilized whenever it is desired to eliminate a vibration of given characteristics, such as a vibration of an airplane wing, of an engine, and so on.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the the principle of the present invention as comprehended within the scope of the appended claims.

What I claim is:

1. In combination with a body subjected to influences comprising at least one force of substantially constant value rotating radially in a plane about an axis, a device of the type described, which comprises, in combination, a support rigid with said body, a rotating part journalled in said support to turn about an axis substantially perpendicular to the aforesaid plane, means for rotating said part at a speed different from the speed of rotation of said force, at least three pendulums of identical characteristics freely pivoted to said part at eccentric points thereof distributed around the axis thereof, the natural frequency of said pendulums and the speed of rotation of said rotating part being such that said pendulums automatically oscillate so as to produce a resultant force which constantly opposes and at least partly compensates the first mentioned force.

2. In combination with a body subjected to influences comprising at least one force of substantially constant value rotating with a speed N radially in a plane about an axis perpendicular to the aforesaid plane, a device of the type described which comprises in combination a support rigid with said body, a part journalled in said support to turn about an axis substantially perpendicular to the aforesaid plane, means for rotating said part at a speed $n$, a pendular system comprising at least three pendulums of identical characteristics freely pivoted to said part at eccentric points thereof distributed around the axis thereof, the natural frequency of said pendulums in the field of centrifugal force being equal to $nf$ and the formula $nf=n-N$ being substantially fulfilled.

3. A combination as in claim 2, wherein the pendular system comprises four pendulums distributed in two pairs, the pendulums of each pair being oppositely disposed to one another and the two pairs at 90° to one another.

4. In combination, an internal combustion engine, a propeller, means for interconnecting said engine and propeller so that they turn at different speeds about parallel axes, a shaft for said engine, a shaft for said propeller, and at least three pendulums eccentrically pivoted to the engine shaft, said pendulums being identical and of a period such that they automatically compensate the unbalancing of said propeller.

5. In combination, an internal combustion engine assembly comprising a driving shaft, said assembly being subjected to a rotating force acting radially relatively to the axis of said driving shaft, a driven shaft parallel to said driving shaft, means interconnecting said shafts so that they rotate at different speeds, and at least three pendulums eccentrically and pivotally mounted on the driven shaft and of such natural frequency that, when oscillating under the effect of said rotating force, they produce a resultant force which constantly opposes and at least partly compensates said rotating force.

6. In combination with a body subjected to influences comprising at least one pulsatory force of a frequency A rotating at a speed B radially in a plane about an axis perpendicular to the plane, a device of the type described which comprises in combination a support rigid with said body, a part journalled in said support to turn about an axis substantially perpendicular to the aforesaid plane, means for rotating said part at a speed $n$, and two pendular systems each of which comprises at least three pendulums of identical characteristics freely pivoted to said part at eccentric points thereof distributed around the axis thereof, the natural frequencies $nf^1$ and $nf^2$ respectively of the pendulums of each pendulum system in the field of centrifugal force being respectively equal to $$nf^1=n-N^1$$

and $$nf^2=n-N^2$$

$N^1$ and $N^2$ being calculated by the formulae $$A=\frac{N^1-N^2}{2} \text{ and } B=\frac{N^1+N^2}{2}$$

7. In combination with a body subjected to influences comprising at least one force of substantially constant value rotating radially in a plane about an axis, a device of the type described, which comprises, in combination, a rotating part journalled to turn about an axis fixed with respect to said body and substantially perpendicular to the aforesaid plane, means for rotating said part at a speed different from the speed of rotation of said force, at least three pendulums of identical characteristics freely pivoted to said part at eccentric points thereof distributed around the axis thereof, the natural frequency of said pendulums and the speed of rotation of said rotating part being such that said pendulums automatically oscillate so as to produce a resultant force which constantly opposes and at least partly compensates the first mentioned force.

8. In combination with a body subjected to influences comprising at least one force of substantially constant value rotating with a speed N radially in a plane about an axis, a device of the type described, which comprises, in combination, a rotating part journalled to turn about an axis fixed with respect to said body and substantially perpendicular to the aforesaid plane, means for rotating said part at a speed $n$ different from the speed of rotation of said force, at least three pendulums of identical characteristics freely pivoted to said part at eccentric points thereof distributed around the axis thereof, the natural frequency of said pendulums in the field of centrifugal force being equal to $nf$ and the formula $nf=n-N$ being substantially fulfilled.

9. A combination as in claim 8 wherein said body comprises a rotating shaft rotating at the speed N, and the said means comprises a transmission gear connecting said part and shaft.

RAOUL ROLAND RAYMOND SARAZIN.